United States Patent [19]

Yoshida et al.

[11] Patent Number: 4,816,228
[45] Date of Patent: Mar. 28, 1989

[54] APPARATUS FOR MELTING WASTE

[75] Inventors: Shuichi Yoshida; Eiji Sawada, both of Handa; Akio Jinno, Chita, all of Japan

[73] Assignee: NGK Insulators, Ltd., Aichi, Japan

[21] Appl. No.: 834,764

[22] Filed: Feb. 28, 1986

[30] Foreign Application Priority Data

| Mar. 14, 1985 | [JP] | Japan | 60-49367 |
| Mar. 15, 1985 | [JP] | Japan | 60-50554 |
| Mar. 19, 1985 | [JP] | Japan | 60-53273 |

[51] Int. Cl.$^4$ .................... B01J 19/02; B01J 19/08
[52] U.S. Cl. .................... 422/159; 219/10.67; 373/72; 422/78; 422/199; 422/248
[58] Field of Search ............. 422/159, 307, 78, 249, 422/248, 199; 373/72; 252/626, 632, 633; 219/10.67

[56] References Cited

U.S. PATENT DOCUMENTS

| 2,332,943 | 10/1943 | Sobers | 422/78 |
| 3,857,679 | 12/1974 | Allred | 422/249 |
| 3,883,441 | 5/1975 | Murphy et al. | 422/159 |
| 3,918,956 | 11/1975 | Baum | 75/3 |
| 4,196,169 | 4/1980 | Gablin et al. | 422/159 |
| 4,246,233 | 1/1981 | Sheeline | 422/159 |
| 4,304,623 | 12/1981 | Ciszek | 156/408 |
| 4,313,845 | 2/1982 | Cowan et al. | 422/159 |
| 4,590,043 | 5/1986 | Sanjurjo | 422/248 |
| 4,633,051 | 12/1986 | Olson | 219/10.67 |

FOREIGN PATENT DOCUMENTS

| 2033074 | 11/1971 | Fed. Rep. of Germany . |
| 2214092 | 8/1974 | France . |
| 2357842 | 2/1978 | France . |
| 2466730 | 4/1981 | France . |
| 1239710 | 7/1971 | United Kingdom . |
| 1579562 | 11/1980 | United Kingdom . |

Primary Examiner—Michael S. Marcus
Attorney, Agent, or Firm—Parkhurst, Oliff & Berridge

[57] ABSTRACT

A waste melting apparatus includes a waste melting vessel placed in a furnace body made of nonmetallic material and an induction heating coil is provided around the furnace body. The waste melting vessel is made of conductive ceramic material such as C-SiC or C-Al$_2$O$_3$ so that the vessel itself generates heat by induction heating to melt waste in the vessel effectively and safely even within a temperature range of 1,300°–1,600° C. The furnace body may be provided with a vertically movable bottom plate for openably closing the bottom of the furnace body permitting the waste to be melted and solidified in the waste melting vessel in a batch-type system. Alternatively, the waste melting vessel may be provided with a melt discharge pipe at the bottom thereof and the discharge pipe downwardly extends through the bottom plate of the furnace body and thereby the waste can be continuously melted and discharged from the melting vessel into a container placed under the discharge pipe.

15 Claims, 6 Drawing Sheets

FIG_6
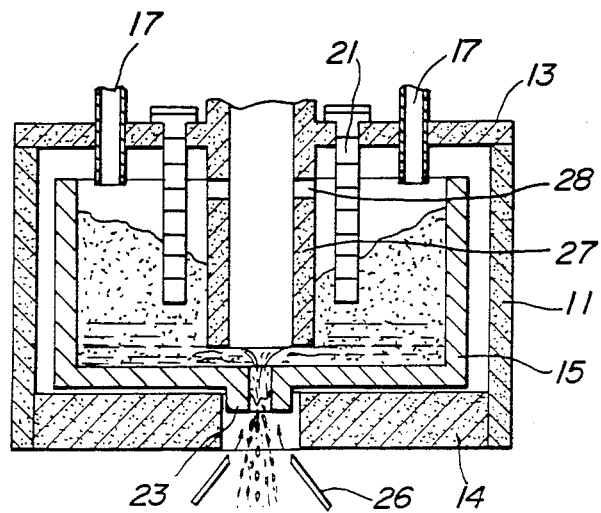
FIG_7
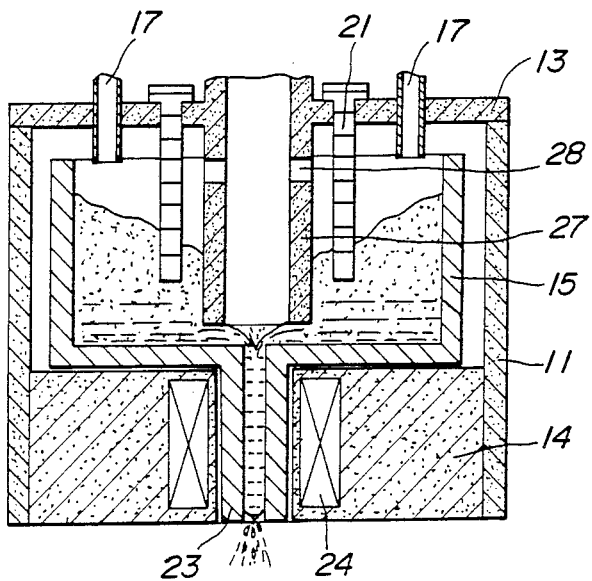

APPARATUS FOR MELTING WASTE

BACKGROUND OF THE INVENTION

1. Field of the Invention

The present invention relates to an apparatus for melting a waste product such as a radioactive waste product.

2. Related Art Statement

In a treatment of the radioactive waste contaminated by radioactivity generated from radioactive material handling installations, such as an atomic power plant and the like, it has been well known to increment a combustible waste to ashes and then store the ashes in a suitable place in the installation after placing them in a drum and the like. However, these incinerated ashes are of a powdery granular nature, so that it is desired to stabilize the incinerated ashes and to reduce their volume when the incinerated ashes are filled into the drum for transporting and storing purposes. Such treatment of ashes has been recently studied.

Some methods of treating the radioactive waste have been proposed and the following two methods are typical; namely, a first method in which the radioactive waste or incinerated ashes are solidified by mixing with cement and a second method in which the radioactive waste or incinerated ashes are solidified by mixing with asphalt, plastics and the like.

In the firsrt method of solidfying with cement, however, in order to obtain a solid body having a stable density and strenght by mixing the waste or ashes with cement, it is necessary to add cement to the ashes in a weight of more than 4. Accordingly, there is a disadvantage in that the volume of a treated solid body significantly increases to be more than the volume of ashes and the like to be treated. In the second method of solidfying with asphalt and plastics, it requires pretreatments such as removing and crushing of metal pieces in the waste or incinerated ashes and facilities for carrying such treatment become complex and large.

Recently, there has been proposed a third method of melting and solidfying the waste and ashes. This third method can effectively remove the disadvantages in the above first and second methods. In the third method, however, the temperature for melting the wastes or incinerated ashes is attained by heating a metal vessel by means of electromagnetic induction. However, the maximum operating temperature is limited to a temperature of 1,000°–1,200° C., so that a melting treatment of waste and the like having a melting point higher than the aforementioned maximum operating temperature is impossible.

SUMMARY OF THE INVENTION

An object of the invention is to eliminate the above disadvantages and to provide an apparatus which can melt radioactive waste or incinerated ashes even at a temperature of 1,300°–1,600° C. and can convert the waste or ashes into a stable treated solid body of reduced volume suitable for transportation and storage.

Another object of the invention is to provide an apparatus for continuously melting waste with high efficiency.

A further object of the invention is to provide an apparatus for continuously melting the waste, the discharge of which can be regulated continuously or optionally.

A still further object of the invention is to provide an apparatus for melting the waste which can simultaneously incinerate and melt the waste.

According to the present invention, an apparatus for melting the waste comprises a furance body including a sidewall made of a nometallic material, an upper lid is gastightly secured to the upper end of the sidewall and provided with a waste supply inlet and a discharge outlet for exhaust gases a bottom plate for closing the bottom of the furnace body; an indication heating coil provided at an outer peripheral portion of the sidewall; and a waste melting vessel made of a conductive ceramic material and placed on the bottom plate within said furnace body.

In a further embodiment of the present invention, the apparatus further comprises one or more additional rod-shaped internal heating elements made of conductive ceramic material arranged in the waste melting vessel which is also made of conductive ceramic material in order to obtain a required high temperature for melting in a short amount of time. The conductive ceramic material is C—SiC based or C—Al$_2$O$_3$ based ceramics. It is preferable to provide an oxygen supply pipe extending through the upper lid of the furnace body into the waste melting vessel for supplying oxygen containing gas in order to incinerate and melt the waste simultaneously. Furthermore, means for sensing the melt condition in the vessel may be provided on the upper lid of the furnace body.

In a preferable embodiment of the invention, the bottom plate of the furnace body may be arranged to move vertically from an elevated position closing the bottom of the furnace body to a descended position for removing the waste melting vessel containing the solidified waste. The method permits a batch treatment of the waste in the melting vessel.

Another preferable embodiment of the invention provides the waste melting vessel with a melt discharge pipe at the bottom thereof and the discharge pipe extends into a through hole in the bottom plate of the furnace body downwardly in order to continuously melt the waste in the vessel and discharge the melt from the vessel into a container placed under the discharge pipe.

According to the invention, the waste melting vessel is made of a conductive ceramic material such as C-SiC based ceramics, C-Al$_2$O$_3$ based ceramics or the like, so that the vessel itself generates heat by induction heating thereby melting the waste charged into the melting vessel from the waste inlet by the heat of the melting vessel effectively and safely within the high temperature range of 1,300°–1,600° C.

BRIEF DESCRIPTION OF THE DRAWINGS

The above and other objects and advantages of the present invention will be more clear from the following description of illustrative embodiments and the following drawings, in which:

FIG. 6 and FIG. 7 are vertical sectional views of the essential portions showing alternative embodiments of the apparatus shown in FIG. 5.

DESCRIPTION OF THE PREFERRED EMBODIMENTS

Figure 1:
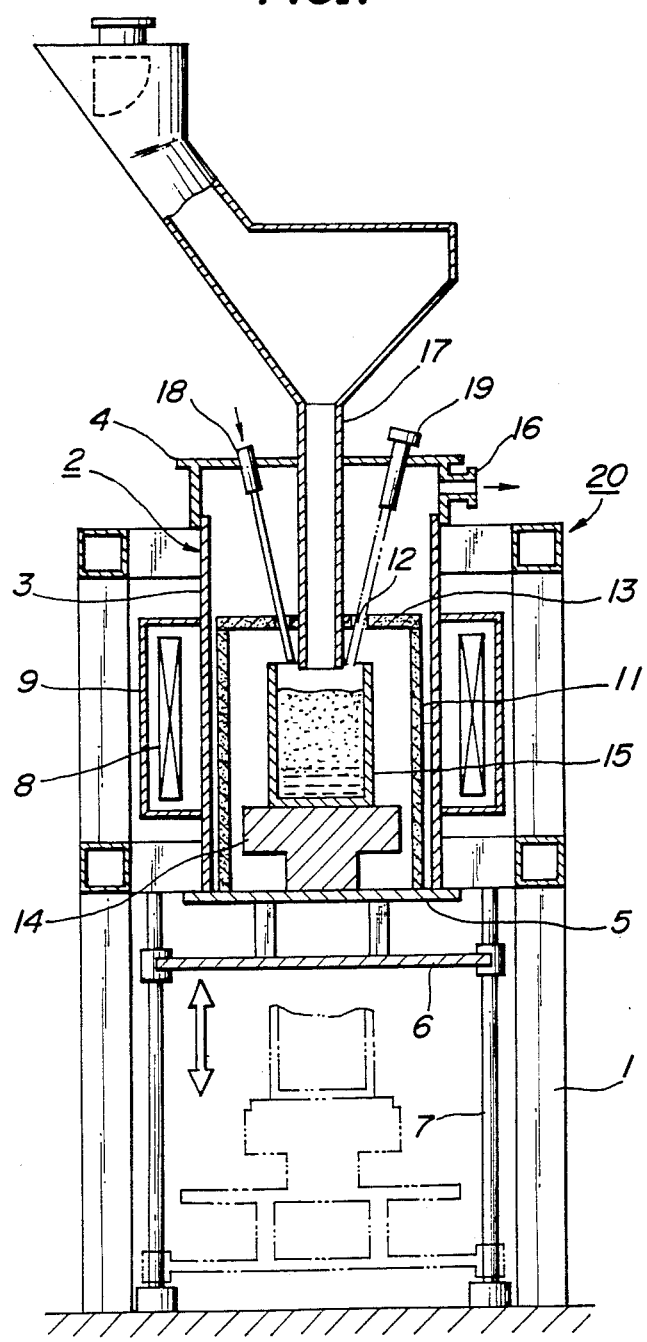
FIG. 1 is a vertical sectional view showing an embodiment of the melting and solidfying apparatus according to the invention.

FIG. 1 shows one embodiment for melting and solidifying the radioactive waste according to the invention. In FIG. 1, a support frame 1 is vertically built on a base to support a furnace body 2 at an elevated position. The furnanace body 2 is formed from a closed container and sealed gastightly. The furnace body includes a cylindrical sidewall 3 made of a nonmetallic material such as quartz, a metal upper lid 4 secured to the upper end of the sidewall and a movable bottom plate 5 openably closing the bottom of the furnace body. The bottom plate 5 is supported on a lift 6 which is guided by vertical guides 7 and driven by means of a conventional driving device such as a motor or the like (not shown) so as to be moved up and down. An induction heating coil 8 is provided at the outer peripheral portion of the sidewall 3. The induction heating coil 8 is covered by means of a cover 9 and cooled by a known cooling method such as air cooling or water cooling. On the other hand, a cylindrical heat insulating wall 11 made of heat insulating material such as asbestos, castable refractories and the like is provided inside the sidewall 3 of the furnace body 2. A heat insulating lid 13 provided with a hole 12 is secured to the upper end of the heat insulating wall 11. The heat insulating wall 11 and lid 13 may be fixed to and supported by the furnace body 2 or the support frame 1.

There is a support 14 made of nometallic material such as a heat insulating material fixed on the bottom plate 5. On the support 14 is placed a waste melting vessel 15 made of a conductive ceramic material, preferably C-SiC based or C-Al$_2$O$_3$ based ceramics. The vessel 15 can be moved together with the support 14 integral with the bottom plate 5 and insertable inside the heat insulating wall 11 from the lowr end thereof. An exhaust gas discharge outlet 16 is provided at the upper portion of the furnace body 2 so as to dicharge exhaust gas and the like generated during the operation of melting to the outside through the hole 12 provided in the heat insulating lid 13. Further, the upper lid 4 of the furnace body 2 is provided with a waste supply inlet 17 for supplying radioactive waste and the like to the waste melting vessel 15 and an oxygen supply pipe 18 for supplying oxygen-containinining gas necessary for completely incinerating the waste or non-incinerate parts of the incinerated ashes supplied to the vessel 15, if necessary. The upper lid 4 is further provided with a radiation thermometer for sensing the melt condition in the vessel 15, a level gauge and a sensor 19 such as a monitor TV and the like, respectively, which pass through the lid portion 4.

In the radioactive waste melting and solidifying apparatus 20 having the above-described construction, when an electric current is supplied to the induction heating coil 8, the waste melting vessel 15 made of conductive ceramic material is directly heated, and hence the waste can be melted within a high temperature range of 1,300°–1,600° C. When the melt in the vessel 15 reaches a predetermined amount, the furnace body 2 is cooled by natural cooling or the like and when the melt is solidified in the vessel 15, this vessel 15 is moved down by the lift 6 and removed from the support 14. A new vessel 15 is then placed on the support 14 and the above steps may be repeated.

Figure 2:
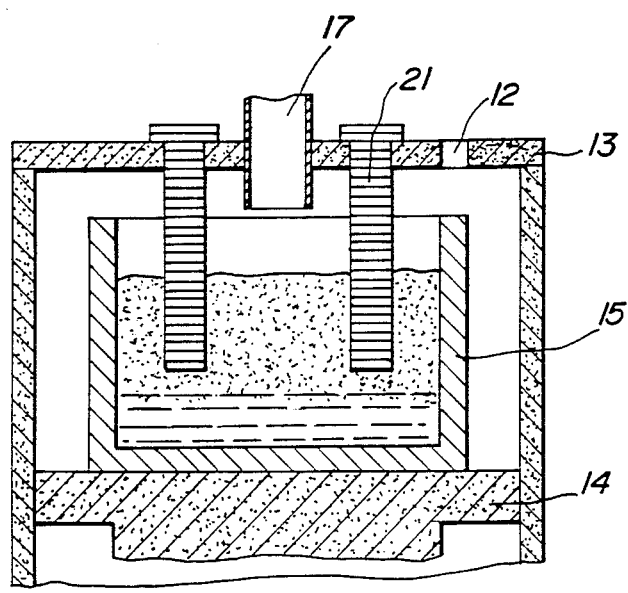
FIG. 2 is a vertical sectional view of the essential portion showing another embodiment of the apparatus shown in FIG. 1.

FIG. 2 shows another embodiment of the melting and solidifying apparatus shown in FIG. 1, in which the same parts as those of the embodiment shown in FIG. 1 are denoted with the same reference numerals and the explanation thereof is omitted. In this embodiment, in order to improve an efficiency of the induction heating in the waste melting vessel 15 made of the conductive ceramic material, rod-shaped internal heating elements 21 made of conductive ceramic material are inserted into the waste melting vessel and supported by the heat insulating lid 13. According to the above construction, electromagnetic waves at the time of induction heating also act upon the internal heating elements 21 and a temperature of 1,300°–1,600° C. can be obtained in a short amount of time.

Figure 3:
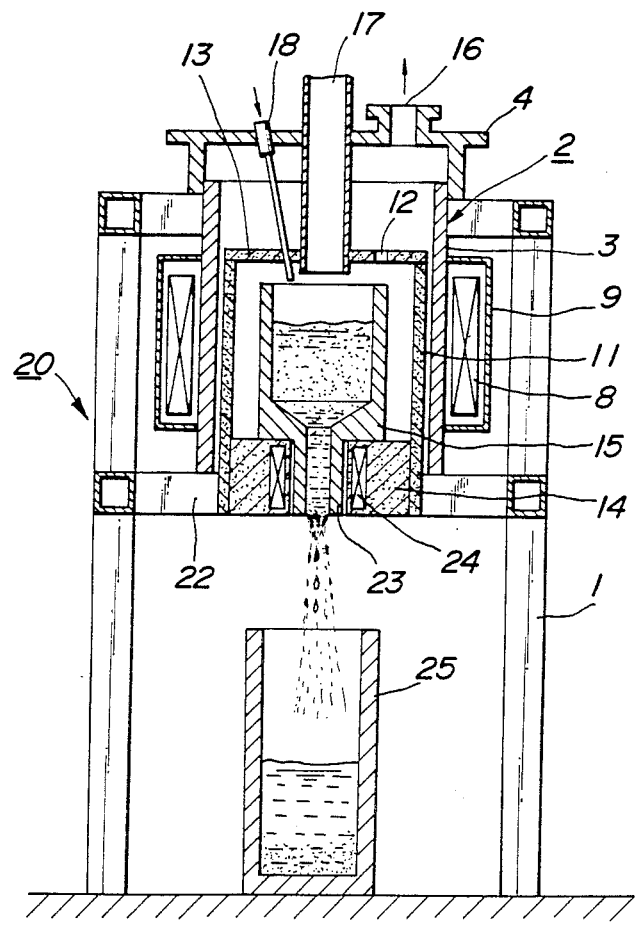
FIG. 3 is a vertical sectional view showing one embodiment f the continuous waste melting apparatus according to the invention.

FIG. 3 shows one embodiment for continuously melting the radioactive waste according to the invention, in which the same parts as those of the embodiment shown in FIG. 1 are denoted with the same reference numerals and the explanation thereof is omitted.

In the present embodiment, the furnace body 2 has a bottom plate 22 rigidly secured to the support frame 1. The melting vessel 15, made of a conductive ceramic material, is placed on the support 14 made of a heat insulating material at the inside of the heat insulating wall 11. The support 14 and the wall are support by the bottom plate 22. The melting vessel 15 has a melt discharge pipe 23 provided at the bottom thereof. The melt discharge pipe 23 downwardly extends into through holes formed at the central portions of the support 14 and the bottom plate 22.

The support 14 is provied with an induction heating coil 24 in a portion surrounding the melt discharge pipe 23 to provide a freezed valve for regulating the discharge of the melt from the waste melting vessel 15. Further, a container 25 is placed under the discharge pipe 23 for receiving the flow of the melt discharged from the discharge pipe of the vessel 15.

In the continuous waste melting apparatus 20 having the above-mentioned construction, when an electric current is supplied to the induction heating coil 8 to heat the waste melting vessel 15 by an induced current generated therein, the melting vessel 15 itself generates heat to become high resulting in a high melting temperature and continuously melts the waste with high efficiency. It is also possible by the above freezed valve system, that the discharge pipe 23 is heated by the induction heating coil 24 as a discharge regulating means only when the melt is discharged so as to discharge the melt. The discharge pipe 23 is air-cooled by terminating induction heating at the time of stopping the melt, and the melt is cooled and solidified in the discharge pipe 23.

Figure 4:
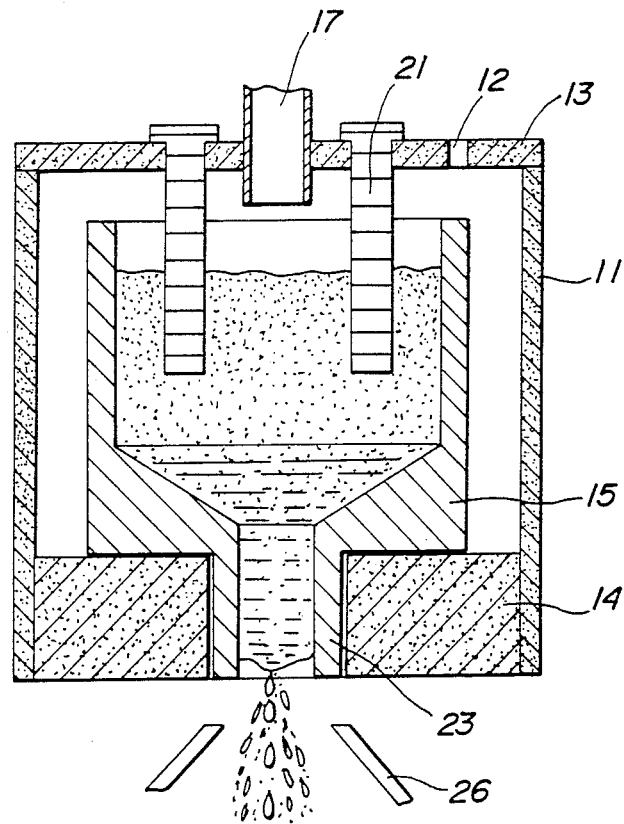
FIG. 4 is a vertical sectional view of the essential portion showing another embodiment of the apparatus shown in FIG. 3.

FIG. 4 shows another embodiment of the continuous waste melting apparatus shown in FIG. 3, in which the same parts as those of the embodiment shown in FIG. 3 are denoted with the same reference numerals and the explanation thereof is omitted. In this embodiment, in order to improved the efficiency of induction heating in the waste melting vessel 15, rod-shaped internal heating elements 21, made of a conductive ceramic material, are inserted into the waste melting vessel 15 and suspended from the heat insulating lid 13. In this embodiment, as a means for regulating the discharge of the melt, compressed air injection nozzles 26 are provided. According to the above construction, a high temperature of 1,300°-1,600° C. can be attained in a short amount of time by also acting electromagnetic waves at the time of induction heating upon the internal heating elements 21 and the discharge of melt can be regulated by air from the injection nozzles 26.

Figure 5:
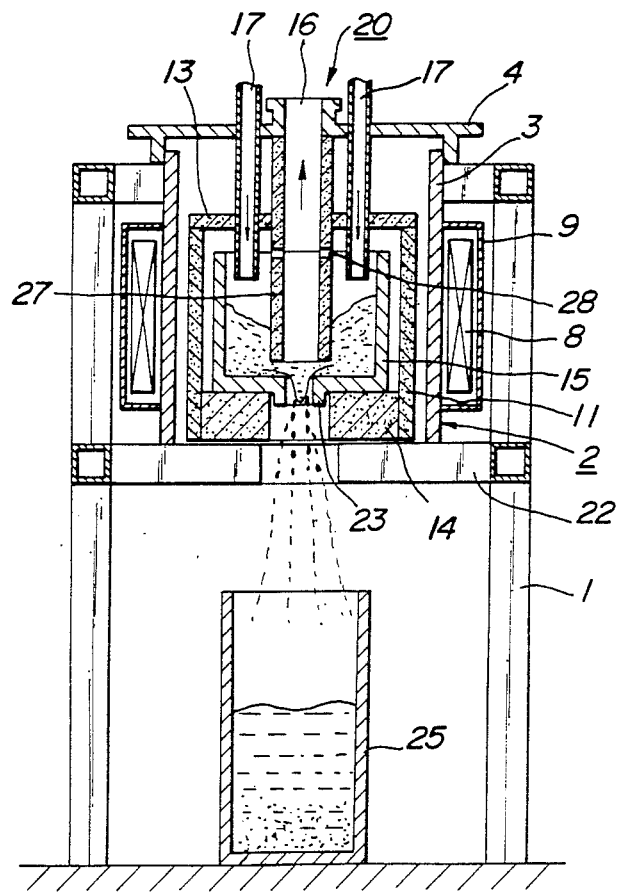
FIG. 5 is a vertical sectional view showing another embodiment of the continuous waste melting apparatus according to the invention.

FIG. 5 shows another embodiment for continuously melting the waste according to the invention, in which the same parts as those of the embodiment shown in FIG. 3 are denoted with the same reference numerals and the explanation thereof is omitted. In this embodiment, a shield 27 is arranged in the waste melting vessel 15 so as to provide a predetermined space between the sidewall of the waste melting vessel and the shield. At least two waste supply pipes 17 extend through the upper lid 4 and the heat insulating lid 13 into the space between the sidewall of the waste melting vessel 15 and the shield 27. The shield 27 is cylindrical and may be integrally molded with the heat insulating lid 13 so as to communicate with the exhaust gas outlet 16. Therefore, the exhaust gas generated in the melting vessel 15 is discharged to the outside atmosphere through exhaust vents 28 formed in the upper portion of the shield 27 and the outlet 16. Further, between the bottom of the melting vessel 15 and the lower end of the shield 27 is provided a sufficient space for flowing of the melt. The shield 27 may be made of refractory ceramics or a heat resistant metal.

In the continuous waste melting apparatus 20 having the above-mentioned construction, when an electric current is supplied to the induction heating coil 8 to heat the waste melting vessel 15, which is made of a conductive ceramic material, by an induced current generated therein, the melting vessel 15 itself generates heat to result in high melting temperatures and continuously melts the waste with the high efficiency.

FIG. 6 and FIG. 7 show further embodiments of the continuous waste melting apparatus shown in FIG. 5, in which the same parts as those of the embodiment shown in FIG. 5 are denoted with the same reference numerals and the explanation thereof is omitted. In the embodiment shown in FIG. 6, in order to improve efficiency of induction heating in a waste melting vessel 15, rod-shaped internal heating elements 21 made of conductive ceramics and suspended from the heat insulating lid 13 to be positioned in the space between the sidewall of the vessel 15 and the shield 27. Furthermore, a regulating means for regulating discharge or solidification of melt in the melt discharge pipe 23 is provided. This regulating means includes air nozzles 26 for directing compresses air only from the discharge outlet of the melt discharge pipe 23, and cools and solidifies the melt at the discharge outlet. In the embodiment shown in FIG. 7, the rod-shaped internal heating elements 21 are made of conductive ceramics and are suspended from the heat insulating lid 13 in the same manner as in the embodiment shown in FIG. 6. An induction heating coil 24 is provided at a position corresponding to the melt discharge pipe 23 in the support 14 to provide a freezed valve type melt regulating means.

In the continuous waste melting apparatus having the above mentioned construction, the discharge of the melt can be effected continuously, or the melt can be discharged intermittently by cooling or induction heating by the melt regulating means.

The invention is not limited to the above embodiments, but can be modified or changed without departing from the spirit or scope of the appended claims. For example, in the above embodiment, the support 14 and the furnace body 2 are provided separately, but the support 14 may be integral with the sidewall or the bottom plate of the furnace body 2. Further, when the furnace body 2 has high heat insulating properties, the sidewall 11 and the heat insulating lid 13 may be omitted.

It is apparent from the above explanation that according to the waste melting apparatus of the invention, the waste melting is made of conductive ceramic material, so that the apparatus can be used safely and effeciently even at a high temperatures of 1,300°-1,600° C., and it become possible to melt radioactive waste having a melting point higher than 1,300° C., which has hitherto been impossible to be melted. Further, there is no requirement for a special heating element for heating the container because the waste melting vessel itself is heated, and as a result, the apparatus itself becomes simple in construction. Moreover, with the use of a melting and solidifying method, the volume of radioactive waste can be safely and effectively reduced.

What is claimed is:

1. An appratus for melting waste comprising a furnace body including a sidewall made of a non-metallic material, an upper lid gastightly secured to an upper end of the sidewall, said upper lid having a waste supply inlet, a discharge outlet for exhaust gases and a bottom plate for closing a bottom portion of the furnace body; an induction heating coil provided at an outer peripheral portion of the sideall; a waste melting vessel comprising a conductive ceramic material selected from the group consisting of a C-SiC based ceramics and C-$Al_2O_3$ based ceramics, said melting vessel being located on the bottom plate within said furnace body, whereby a current is induced in said waste melting vessel, by said induction heating coil, such that said waste melting vessel generates heat to melt the waste, the waste melting vessel comprising a melt discharge pipe provided at a bottom portion thereof, the melt discharge pipe downwardly extending into a through hole in the bottom plate and further comprising a container which communicates with the discharge pipe for receiving the melt discharged from the waste melting vessel; and a means for regulating discharge from the melting vessel through the discharge pipe, the discharge regulating means including at least one compressed air injection nozzle directed toward the outlet portion of the discharge pipe for cooling the melt.

2. The apparatus as claimed in claim 1, wherein the discharge regulating means includes a freeze valve having an induction heating coil arranged around the discharge pipe.

3. The apparatus as claimed in claim 2, further comprising a shielf which is suspended into the waste melting vessel to provide a predetermined space between a sidewall of the waste melting vessel and the shield.

4. The apparatus as claimed in claim 3, wherein the spaced between the sidewall of the waste melting vessel and the shield forms an annular melting chamber.

5. The apparatus as claimed in claim 1, further comprising a shield which is suspended into the waste melting vessel to provide a predetermined space between a sidewall of the waste melting vessel and the shield.

6. The apparatus as claimed in claim 5, wherein the shield is cylindrical and is fixed to the upper lid of the furnace body.

7. The apparatus as claimed in claim 5, wherein the space between the sidewall of the waste melting vessel and the shield forms an annular melting chamber.

8. The apparatus as claimed in claim 5, wherein the shield includes exhaust vents formed in an upper portion thereof.

9. An apparatus for melting waste comprising a furnace body including a sideall made of anon-metallic material, an upper lid gastightly secured to an upper end of the sidewall, said upper lid having a waste supply inlet, a discharge outlet for exhaust gases and a bottom plate for closing a bottom portion of the furnace body; an induction heating coil provided at an outer peripheral portion of the sidewall; a waste melting vessel comprising a conductive ceramic material selected from the group consisting of C-SiC based ceramics and C-Al$_2$O$_3$ based ceramics, said melting vessel being located on the bottom plate within said furnace body, whereby a current is induced in said waste melting vessel by said induction heating coil, such that said waste melting vessel generates heat to melt the waste, the waste melting vessel comprising a melt discharge pipe provided at a bottom portion thereof, the melt discharge pipe downwardly extending into the through hole in the bottom plate and further comprising a container which communicates with the discharge pipe for receiving the melt discharged from the waste melting vessel; and a shield which is suspended into the waste melting vessel to provide a predetermined space between a sidewall of the waste melting vessel and the shield.

10. The apparatus as claimed in claim 9, further comprising a means for regulating discharge from the melting vessel through the discharge pipe.

11. The apparatus as claimed in claim 10, wherein the discharge regulating means includes a freeze valve having an induction heating coil arranged around the discharge pipe.

12. The apparatus as claimed in claim 11, wherein the space between the sidewall of the waste melting vessel and the shield forms an annular melting chamber.

13. The apparatus as claimed in claim 10, wherein the space between the sidewall of the waste melting vessel and the shield forms an annular melting chamber.

14. An apparatus for melting waste comprising a furnace body including a sidewall made of a non-metallic material, an upper lid gastightly secured to an uupper end of the sidewall, said upper lid having a waste supply inlet, a discharge outlet for exhaust gases and a bottom plate for closing a bottom portion of the furnace body; an induction heating coil provided at an outer peripheral portion of the sidewall; a waste melting vessel comprising a conductive ceramic material selected from the group consisting of C-SiC based ceramics and C-Al$_2$O$_3$ based ceramics, said melting vessel being located on the bottom plate within said furnace body, whereby a current is induced in said waste melting vessel by said induction heating coil, such that said waste melting vessel generates heat to melt the waste, the waste melting vessel comprising a melt discharge pipe provided at a bottom portion thereof, the melt discharge pipe downwardly extending into a through hole in the bottom plate and further comprising a container which communicates with the discharge pipe for receiving the melt discharged from the waste melting vessel; and a means for regulating discharge from the melting vessel through the discharge pipe.

15. The apparatus as claimed in claim 14, wherein the discharge regulating means includes a freeze valve having an induction heating coil arranged around the discharge pipe.

* * * * *